(No Model.)

W. L. ELLIS.
COTTON GIN.

No. 249,913.  Patented Nov. 22, 1881.

WITNESSES
John A. Ellis.
Philip Colllasi.

INVENTOR
Washington L. Ellis
by Anderson & Smith
his ATTORNEYS

UNITED STATES PATENT OFFICE.

WASHINGTON L. ELLIS, OF PRATTVILLE, ALABAMA, ASSIGNOR OF ONE-HALF TO MERRILL E. PRATT, OF SAME PLACE.

COTTON-GIN.

SPECIFICATION forming part of Letters Patent No. 249,913, dated November 22, 1881.

Application filed July 30, 1881. (No model.)

*To all whom it may concern:*

Be it known that I, WASHINGTON L. ELLIS, a citizen of the United States, resident of Prattville, in the county of Autauga and State of Alabama, have invented a new and valuable Improvement in Cotton-Gins; and I do hereby declare that the following is a full, clear, and exact description of the construction and operation of the same, reference being had to the annexed drawings, making a part of this specification, and to the letters and figures of reference marked thereon.

Figure 1:
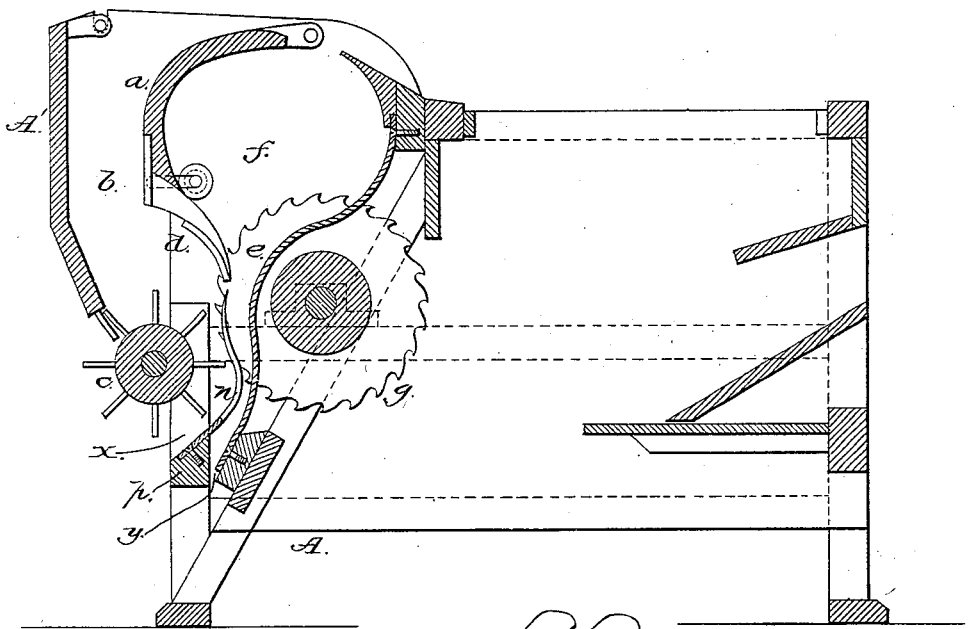
Figure 2:
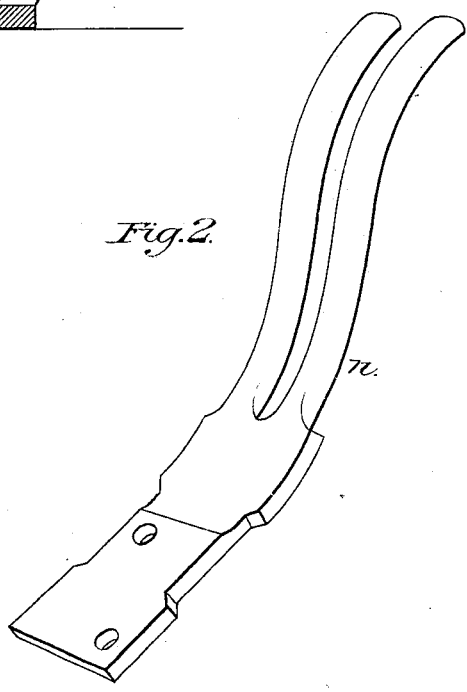

Figure 1 of the drawings is a representation of a longitudinal section of my invention, and Fig. 2 is a perspective view of one of the sections of fingers.

This invention relates to improvements in cotton-gins, and has for its object the production of a gin wherein the hulls and seed can be separated.

The invention consists in the construction and novel arrangement of parts, as hereinafter set forth.

In the annexed drawings, the letter A designates a cotton-gin such as described in Letters Patent No. 223,721, granted to me January 20, 1880, to which my improvement is applied.

In this gin the letter *a* represents the breast-board, and *b* the passage between the same and the hinged apron A'; *c*, the spiked roller or drum; *d*, the supplemental ribs; *e*, the main ribs; *f*, the cotton-box, and *g* the saws, all constructed and arranged as set forth in the patent referred to. In the new arrangement greater space is left between the main ribs and the spiked roller, and in this space are placed the fingers *n*.

A transverse bar, *p*, is secured in the gin in front of the lower bar of the main ribs, and to this bar *p* is fastened the lower ends of the fingers, which extend backward and then curve upward and forward, terminating very close to the lower ends of the supplemental ribs. These fingers may be constructed in sections, or the entire set may be made in one piece, or they may be entirely separate.

As the cotton-bolls are fed down the channel or passage *b* the spiked roller throws them against the saws, the teeth of which project beyond the fingers. The hulls are separated and fall down outside of the fingers at *x*, the seed and cotton pass up into the box, and the seed drop down inside of the fingers at *y*, so that the hulls and seed are discharged at different points and without being mixed.

Having described my invention, what I claim, and desire to secure by Letters Patent, is—

In a cotton-gin, the combination, with the saws *g*, main ribs *e*, supplemental ribs *d*, and toothed roller *c*, of the fingers *n*, hinged breast-board *a*, and hinged apron A', substantially as and for the purposes specified.

In testimony that I claim the above I have hereunto subscribed my name in the presence of two witnesses.

WASHINGTON LAFAYETT ELLIS.

Witnesses:
W. T. AMBINGTON,
DANIEL PRATT.